Figure 1:
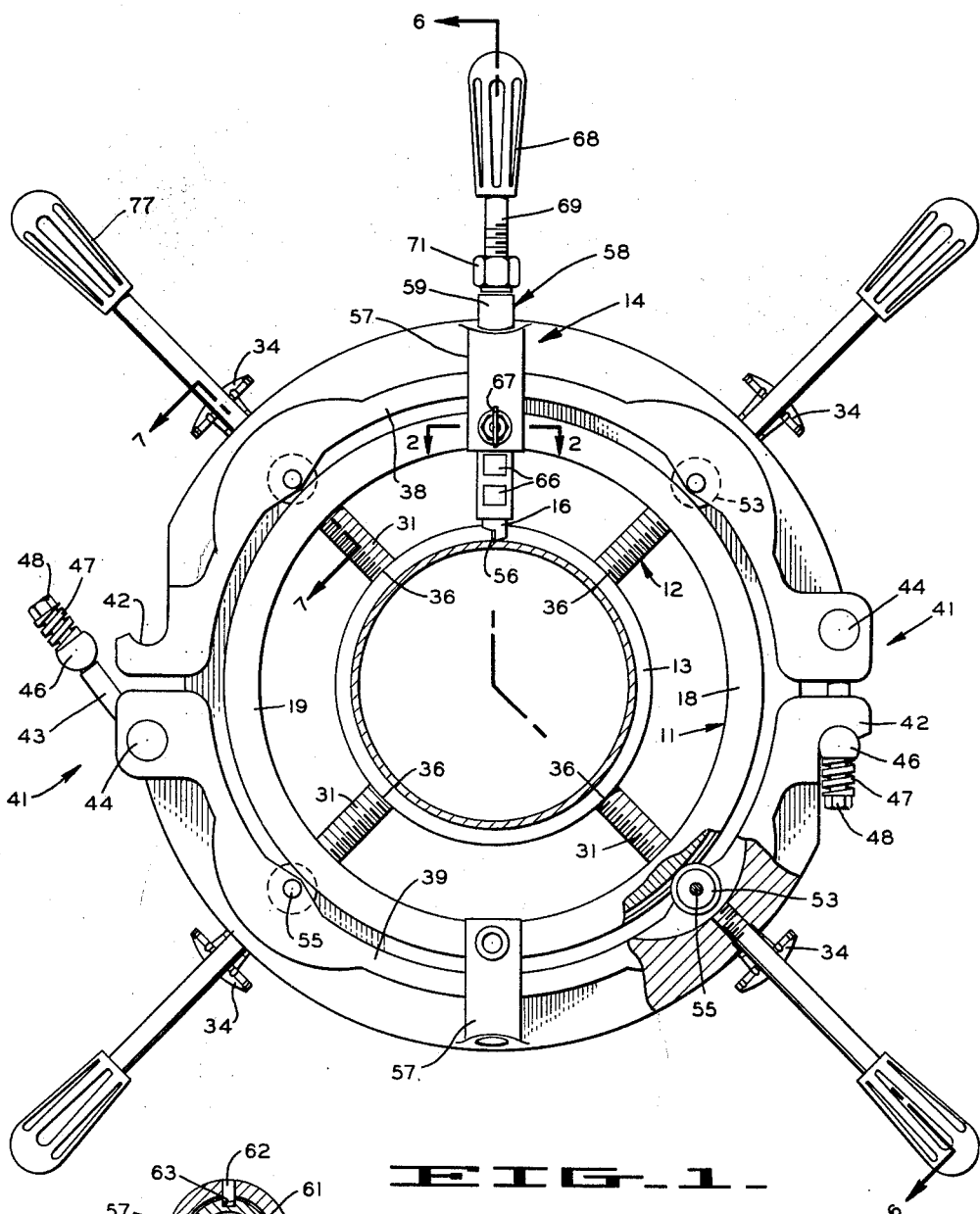

Sept. 29, 1964     J. B. GILL     3,150,447
PIPE CUTTER

Filed May 15, 1961     3 Sheets-Sheet 1

INVENTOR.
JOHN B. GILL
BY
Schapp & Hatch
ATTORNEYS

Sept. 29, 1964
J. B. GILL
3,150,447
PIPE CUTTER
Filed May 15, 1961
3 Sheets-Sheet 2
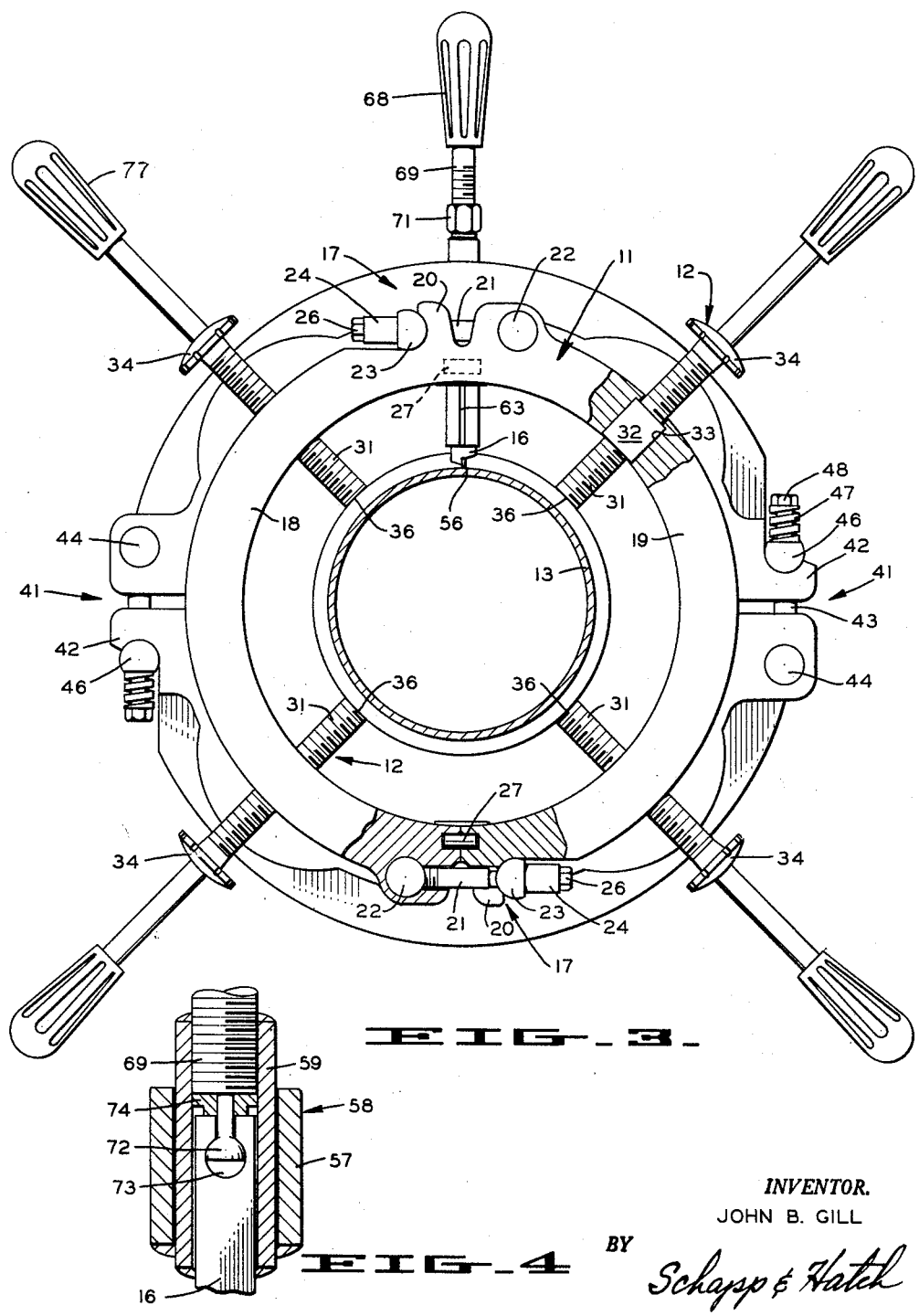
FIG_3.
FIG_4
INVENTOR.
JOHN B. GILL
BY
*Schapp & Hatch*
ATTORNEYS Sept. 29, 1964
J. B. GILL
3,150,447
PIPE CUTTER
Filed May 15, 1961
3 Sheets-Sheet 3
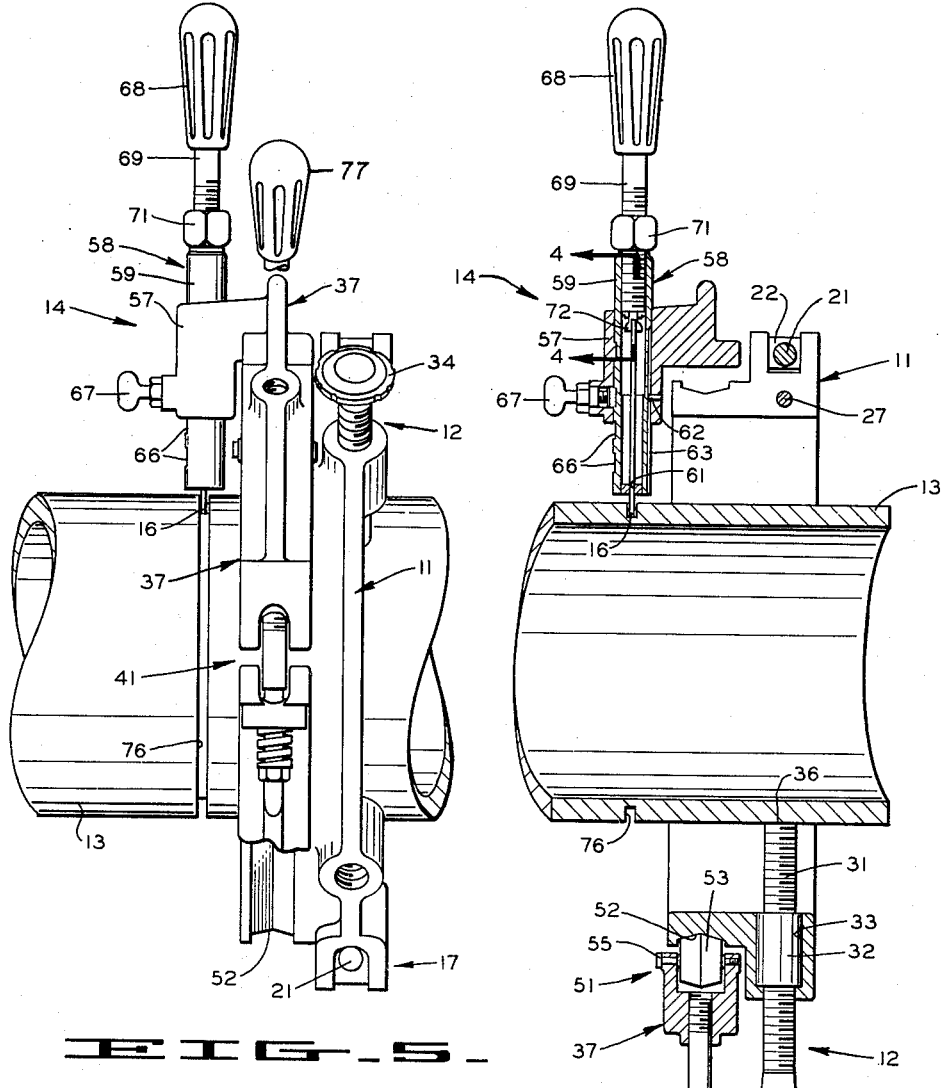
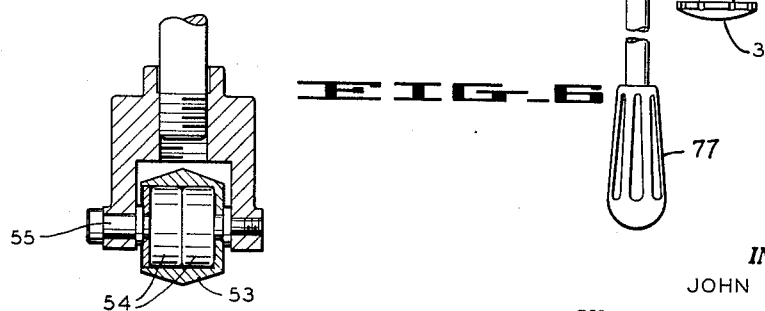
INVENTOR.
JOHN B. GILL
BY
Schapp & Hatch
ATTORNEYS

# United States Patent Office 3,150,447
Patented Sept. 29, 1964

3,150,447
PIPE CUTTER
John B. Gill, 2433 Earl St., Torrance, Calif.
Filed May 15, 1961, Ser. No. 109,888
4 Claims. (Cl. 30—96)

This invention relates to improvements in a pipe cutter and more particularly to cutters specially suited for severing asbestos-cement pipes and the like.

The cutting of asbestos-cement pipes presents several unique problems arising from the nature of the material from which the pipe is constructed. These pipes are quite rigid but the asbestos-cement mixture is fairly soft and fibrous when machined from the densely compacted pipe. This makes it necessary to cut the pipe by machining a groove therearound which is made deeper and deeper until the pipe is severed. This form of cutting produces a smooth end and does not crush or distort the pipe.

Previous asbestos-cement pipe cutters have been of the articulated type, that is, a plurality of links are mounted around the pipe and are supported by rollers which travel on the surface of the pipe. The earliest of these cutters consisted basically of a chain and a cutting head which mounted the cutting blade. This structure was particularly prone to bind due to cocking action of the blade caused by resistance of the pipe material.

Improved turning action was obtained through the invention of a pipe cutter utilizing considerably longer link units each of which was adjustable as to length. Such construction is shown in my Patent No. 2,641,103 issued June 9, 1953 and entitled "Detachable Link for Pipecutting Tools." Further improvement to better resist cocking action of the blade is shown and described in my Patent No. 2,962,814 issued December 6, 1960 and entitled "Tool for Cutting Pipe."

Even with the improved construction of my aforesaid patents, certain problems of binding and misalignment may occur where the pipe is out of round or has dirt or other debris clinging to its outer surface. Under such conditions the rollers are forced to travel a noncircular path and, while the articulated construction compensates somewhat for this, it is possible to create considerable resistance to rotation of the cutter around the pipe.

The present invention contemplates a cutter for asbestos-cement pipes which includes a circular guideway upon which the cutter rotates together with means for positioning the guideway in concentric relation to the pipe to be cut. This provides a clean, circular track upon which the element which carries the cutter may rotate freely, and therefore the only resistance to the turning of the device will be the resistance of the blade tip as it cuts through the pipe.

The means for centering the guideway is designed to accommodate various sizes of pipe having different outside diameters and thus makes it possible to use a single cutter for a wide variety of jobs. The cutting blade is mounted to cooperate with the centering means in increasing the adaptability of the present device.

Accordingly it is a principal object of the present invention to provide a tool for cutting asbestos-cement pipe and the like which will rotate freely under all conditions of use regardless of whether the pipe is out of round or has dirt or other debris on its surface.

Another object of the present invention is to provide a pipe cutter of the character described which occupies a minimum of space in the trench and which may be easily and conveniently operated without the necessity of reaching around the pipe.

A further object of the present invention is to provide a pipe cutter of the character described which includes means for quickly and precisely positioning the unit in a desired concentric relation to the pipe to be cut.

A still further object of the invention is to provide a pipe cutter which may be easily and quickly installed around the pipe at any point along its length.

Yet another object of the invention is the provision in a pipe cutter of the character described of a cutting blade which is extendable to accommodate different sizes of pipes and which may be operated by a manually engageable handle extending radially therefrom.

Another object of the present invention is to provide a lock assembly for holding a pair of semi-circular frame members rigidly together and which may be easily and quickly released to permit the cutter unit to be removed from the pipe.

Further objects and advantages of my invention will be apparent as the specification progresses, and the new and useful features of my pipe cutter will be fully defined in the claims attached hereto.

Figure 2:
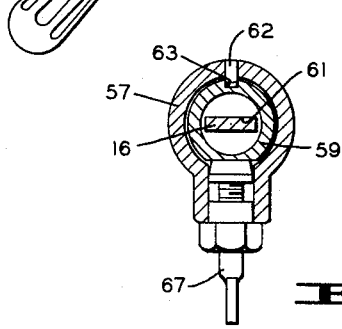

The preferred form of my invention is illustrated in the accompanying drawings, forming part of this application, in which:

FIGURE 1 shows an end elevational view of a pipe cutter constructed in accordance with the present invention and shown being mounted in operative position on a pipe to be cut, portions of the unit being broken away and shown in section to reveal internal construction;

FIGURE 2, an enlarged cross-sectional view taken substantially on the plane of line 2—2 of FIGURE 1;

FIGURE 3, a view similar to that of FIGURE 1 but taken from the opposite side;

FIGURE 4, a vertical cross-sectional view taken substantially on the plane of line 4—4 of FIGURE 6;

FIGURE 5, a side elevational view of the device of FIGURE 1;

FIGURE 6, a cross-sectional view taken substantially on the plane of line 6—6 of FIGURE 1; and FIGURE 7, a cross-sectional view taken substantially on the plane of line 7—7 of FIGURE 1.

While I have shown only the preferred form of my invention, it should be understood that various changes or modifications may be made within the scope of the claims attached hereto without departing from the spirit of the invention.

Referring to the drawings in detail, it will be seen that the pipe cutter of the present invention consists basically of an annular guideway 11, mounting means 12 carried by the guideway and adapted for positioning the latter concentrically around a pipe 13 to be cut, and cutting means 14 journaled for rotation around the pipe 13 and including a cutting blade 16 movable inwardly for severing the pipe as the cutting means is rotated.

The guideway 11 is provided in the form of a mount consisting of a plurality of separable segments adapted for positioning in encircling relation around the pipe 13, together with means 17 for rigidly locking the segments in such encircling relation. As here shown, the mount consists of a pair of semi-circular frame members 18 and 19 which are releasably secured by the locking means 17 in encircling relation about the pipe 13 to be cut.

The means 17 includes a pair of lock assemblies mounted on confronting ends of the frame mmebers 18 and 19. Each of the lock means is individually releasable so that the frame members 18 and 19 may be separated for positioning around the pipe. This makes it possible to mount the pipe cutter at any desired position along the pipe without having to slide the unit inwardly from the pipe end.

As here shown, each of the lock assemblies includes a reverse hook 20 formed on an end of one of the frame members 18 or 19 and an elongated link 21 having a pivotal connection 22 to the confronting end of the other of the frame members. A hook-engaging member 23 is slidably mounted for axial movement on the link 21, and a spacer 24 is interposed between the member 23 and a nut 26 secured to the distal end of link member 21. The nut 26 may be backed off sufficiently to permit the hook-engaging member 23 to be engaged behind the hook 20, and the nut is thereafter tightened to securely hold the frame members 18 and 19 together in a rigid unit. Dowels 27 are provided to insure precise registration of the frame ends.

It is important that the guideway provided by mount 11 be substantially concentric with the pipe 13, and the mounting means 12 is adapted to locate the mount 11 and hold it firmly in the desired position. As will be understood, where the pipe is out of round it will be impossible to obtain true concentricity. However it is desirable to position the guideway as nearly coaxially as possible in order to reduce the number of turns necessary to sever the pipe.

As here shown, the mounting means 12 includes a plurality of radially inwardly extendable support members 31 carried in spaced relation around the mount 11. Preferably the members 31 comprise a series of rods which are threadably engaged through bushings 32 pressed into bores 33 which extend radially through the frame members 18 and 19. The outer ends of the rods 31 are provided with manually engageable handles 34 by which the rods may be individually rotated to move their inner ends 36 radially inwardly and outwardly for achieving the desired concentric positioning of the mount.

While three or more of the mounting rods 31 may be provided, I prefer to use four rods spaced 90° circumferentially of the guideway from the adjacent rods. With this construction, opposing pairs of rods will be axially aligned and their handles 34 may be rotated simultaneously to more quickly orient the pipe to the desired position relative to the mount.

Journaled for rotation on the guideway 11 is a traveling element 37 which supports the cutting blade 16 during its travel around the pipe. The traveling element 37 is somewhat similar in construction to the mount 11 in that it consists of a plurality of separable segments adapted for positioning in encircling relation around the mount together with means for locking the segments in such encircling relation. As here shown, the traveling element 37 is formed of a pair of semi-circular segments 38 and 39 which are provided with locking means on the confronting ends of the segments formed for releasably securing such ends together with the traveling element encircling the mount 11.

The locking means 41 for the segments 38 and 39 is similar to the locking means 17 and comprises a pair of individually releasable lock assemblies. These assemblies comprise a reverse hook 42 formed on one end of each of the frame members 38 and 39, an elongated link 43 having a pivotal connection 44 to the confronting end of the other of the frame members, a hook-engaging member 46 slidably mounted for axial movement on the link 43, and a spring 47 interposed between the member 46 and a nut 48 secured to the distal end of link 43. Spring 47 replaces spacer 24.

As an important feature of the present invention, track and roller means 51 is provided on the mount 11 and traveling element 37, and is formed to permit free rotation of the traveling element around the mount without regard to whether the pipe 13 is out of round or has dirt or other debris on its surface. I prefer to form the track 52 on the mount 11 and mount the rollers 53 on ball bearings 54 carried by axle pins 55 supported by the traveling element 37. In this connection it should be noted that the rollers could be supported on the mount and the track formed on the traveling element should such construction be desired.

To insure that the blade 16 follows a consistent path as it rotates around the pipe 13, the rollers and track are preferably formed with a flattened V-shape configuration which will resist any axial thrust. This construction is self-aligning and presents a minimum of resistance to rotation of the rollers around the track. The configuration of the rollers 53 and track provides a wide surface on each side of the center for tracking purposes. Thus, the concentrated wear that would otherwise occur on a roller having a narrow flange is here eliminated. By the same token a flat roller rolling in a track with a flat bottom would exert concentrated wear on the side of the track. Thus the flattened V-shape of the present track and rollers insures that the rollers will stay in the track while distributing the wear over a wide area, thus increasing longevity, giving better service and at the same time keeping the rollers perfectly centered.

It should be noted that the lock assemblies 41 are formed to exert spring tension tending to urge the segments 38 and 39 together. As may be seen from FIGURE 1 of the drawings, the confronting ends of the segments 38 and 39 do not abut and the spring tension provided by the lock assemblies 41 serves to hold the rollers firmly against the track while at the same time providing enough resilience to avoid breaking the parts should the blade 16 strike an impenetrable obstruction. The nut 48 makes it possible for the operator to vary the tension if necessary so as to allow the rollers to ride over any dirt or debris which might collect temporarily in the track.

As an important feature of the present invention, the cutting blade 16 is carried on one of the segments 38 or 39. As may be seen from the drawings, the segments 38 and 39 are identical in form, as are the frame members 18 and 19. This substantially reduces fabrication costs and tooling expenses.

A boss 57 is provided on each of the segments 38 and 39, but only a single blade is used. This design makes it possible to change the blade assembly from one side of the traveling element to the other so that wear on the rollers 53 may be equalized if necessary.

Means 58 is provided for advancing the cutting blade 16 inwardly against the pipe to accomplish the cutting action and for repositioning the blade tip 56 preparatory to beginning the cut on a different size of pipe. Included in the means 58 is an elongated tubular housing 59 for the blade, the housing being slidably mounted for radial movement in the boss 57. The blade is axially slidable in the housing 59 and extends therefrom through a slot 61 which holds the blade perpendicular to the axis of the pipe to be cut. The housing 59 is held against rotation by a pin 62 engaged in a groove 63 running longitudinally of the housing 59, see FIGURE 6.

The front side of the housing 59 is provided with a series of flats 66 adapted for engagement by a set screw 67 threadably engaged through the boss 57 in position to bear against one of the flats 66.

The blade assembly is moved into correct position for the particular size of pipe to be cut by moving the housing 59 axially and securing it in the desired position by means of set screw 67. Further advance of the blade toward the pipe during the cutting action is accomplished by a manually engageable handle 68 attached to the outer end of the threaded rod 69 which is engaged with a nut 71 attached to the outer end of housing 59. The rod 69 extends into the housing and terminates in a small extension having an enlarged head 72.

As may be seen from FIGURE 4, the upper end of the blade 16 is formed with a circular cut-out portion 73 adapted to receive the enlarged head 72 in a manner similar to a ball and socket joint. This permits the rod 69 to rotate relative to the blade but causes the blade to move axially with the rod. A thrust collar 74 is positioned between the end of rod 69 and the confronting end of blade 16 to provide increased resistance to wear. Thus, the handle 68 may be twisted slightly to advance the blade tip 56 into the groove 76 formed in the pipe 13 thereby. Massive movements of the blade assembly to accommodate different sizes of pipes are accomplished by releasing set screw 67 and moving the housing 59 inwardly or outwardly the required distance.

In operation the inner ring or mount 11 is placed around the pipe. First placing one frame member 18 or 19 on the top of the pipe, the operator then adjusts the mounting rods 31 to as nearly equal lengths as conditions will permit, and backs off on these screws until the ends of the segment are substantially aligned with an imaginary line passing through the center of the pipe on a horizontal plane. The operator then takes the other frame member 18, 19, and fastens it to the one already placed by means of the lock assemblies 17, keeping the centering rods in the newly added frame member screwed back clear of the pipe until the lock assemblies are clamped in place and the rings are preferably matched by means of the dowels 27. It should be noted that the dowels 27 are press-fitted, one to each frame member in such manner that it will enter a matching hole in the opposite frame member, thus assuring the perfect alignment of the rings necessary to obtain a smoothly circular track 52.

Once the frame members are clamped tightly together, the lower mounting rods 31 are adjusted to meet the pipe surface. By measurement, the operator adjusts the rods 31 until the ring is equidistantly spaced from the pipe surface at each rod location.

Once the mount 11 is installed, the traveling element 37, consisting of the two identical semi-circular segments 38 and 39, are placed around the mount with the rollers 53 riding on the track 52.

The installation of the traveling element 37 is accomplished by first placing one of the segments 38 and 39 on top of the mount and then fastening one end of the second segment to the confronting end of the first segment by means of a locking assembly 41. The opposite end of the lower segment is then brought around and secured to the confronting end of the upper segment. The tension provided by the lock assemblies 41 holds the traveling element securely in place on the track 52 but provides sufficient resilient action to permit the rollers to ride over any dirt, debris or other obstruction that may momentarily impede their progress along the track.

The cutter blade 16 is then moved into place by loosening set screw 67 and moving the housing 59 inwardly until its end is only a short distance from the surface of the pipe 13. Set screw 67 is then tightened down against one of the flats 66 to secure the housing 59 in this position.

Suitable rotation of handle 68 moves the blade tip 56 downwardly until it comes into contact with the surface of the pipe 13. The traveling element and blade carried thereby are then rotated around the pipe by means of a plurality of handles 77 secured to and extending radially from segments 38 and 39. As the blade tip passes around the pipe it will cut a shallow groove and at the end of each revolution the handle 68 may be twisted to advance the blade inwardly and cause it to deepen the groove 76 on its next revolution.

It will be noted that there are two rollers 53 to each of the outer segments 38 and 39. After the traversing element 37 is installed, and the outer tension lock assemblies 41 are fastened, all of the rollers 53 will bear on the track 52 with equal pressure. When the blade is extended to touch the pipe wall the pressure on the rollers of the segment carrying the cutting blade will be minimized. While cutting, the pressure exerted by the blade is opposed by the two rollers on the opposite ring. These rollers would naturally tend to wear more quickly than the rollers adjacent to the blade and therefore it is contemplated that the operator may desire to move the blade assembly from one of the segments 38-39 to the other. This may be easily and quickly accomplished by simply removing set screw 67, slipping housing 59 out of its boss 57 and into the corresponding boss on the other segment, and inserting the set screw 67 in the latter boss.

From the foregoing it will be seen that I have provided a novel pipe cutting tool adapted to fit a wide variety of sizes of pipe and which will rotate freely around the pipe being cut even though such pipe is out of round or has dirt or debris adhering to its surface.

I claim:

1. An apparatus for cutting asbestos cement pipe and the like, comprising a mount formed of a pair of semi-circular frame members, locking means on the confronting ends of said frame members formed for rigidly securing such ends together with the mount encircling a pipe to be cut, said frame members being formed to provide an annular track having angularly related bottom walls defining a flattened V-shaped raceway when said locking means is secured, means carried by said mount and adapted for positioning said track in concentric relation around the pipe, a traveling element formed of a pair of semi-circular segments, a reverse hook formed on one of the confronting ends of said segments, an elongated link having a pivotal connection to the confronting end of the other of said segments, a hook-engaging member slidably mounted for axial movement on said link, a spring carried on said link and formed to urge said hook-engaging member toward said pivotal connection, the parts being proportioned so that snapping of the hook-engaging member behind said hook will compress the spring and lock the confronting ends of said frame members together under spring tension while being resiliently yieldable to permit said segments to move apart under unusual stresses, a plurality of rollers mounted in spaced relation around said traveling element and formed to ride on said annular track, said rollers being tapered outwardly from their middles to provide a flattened V-shape complementary to the flattened V-shape of said track for resisting axial thrust and for obtaining a self-cleaning action with respect to any debris which may be deposited on the track, and a cutter blade carried on one of said segments and selectively movable inwardly for severing the pipe as the traveling element is rotated.

2. An apparatus for cutting asbestos-cement pipe and the like, comprising a mount formed of a pair of semi-circular frame members, locking means on the confronting ends of said frame members formed for releasably securing such ends together with the mount encircling a pipe to be cut, said frame members being formed to provide an annular track when said locking means is secured, means carried by said mount and adapted for positioning said track in concentric relation around the pipe, a traveling element formed of a pair of semi-circular segments, a plurality of rollers mounted in spaced relation around said traveling element and formed to ride on said annular track, fastening means on the confronting ends of said segments formed for releasably securing such ends together with the traveling element encircling said mount, said fastening means comprising a reverse hook formed on the end of one of said segments, an elongated link having a pivotal connection to the confronting end of the other of said segments, a hook-engaging member slidably mounted for axial movement on said link, and a spring carried on said link and formed to urge said hook-engaging member towards said pivotal connection, the parts being proportioned so that the snapping of the hook-engaging member behind said hook will compress said spring and lock the confronting ends of said segments together under spring tension whereby the confronting ends of said segments may resiliently move apart to permit said rollers to ride over any debris on said annular track, and a cutter carried on one of said segments and movable inwardly for severing the pipe as the traveling element is rotated.

3. An apparatus for cutting asbestos-cement pipe and the like, comprising a mount formed of a plurality of separable segments adapted for positioning in encircling relation about a pipe to be cut, means for rigidly locking said segments in said encircling relation, a traveling element formed of a plurality of separable segments adapted for positioning in encircling relation about said mount, means for fastening the segments of said traveling element in said encircling relation, track means on said mount and roller means on said traveling element formed to permit said traveling element to rotate around said mount, said roller means being of flattened V-shaped configuration and said track means being of configuration complementary to the configuration of said roller means, means carried by said mount and adapted for positioning said track and roller means in concentric relation to the pipe to be cut, and a cutter carried by said traveling element and movable inwardly for severing the pipe as said traveling element is rotated.

4. An apparatus for cutting asbestos-cement pipe and the like, comprising a mount formed of a pair of semicircular frame members, locking means on the confronting ends of said frame members formed for releasably securing such ends together with the mount encircling a pipe to be cut, said frame members being formed to provide an annular track when said locking means is secured, means carried by said mount and adapted for positioning said track in concentric relation around the pipe, a traveling element formed of a pair of semi-circular segments, fastening means on the confronting ends of said segments formed for releasably securing such ends together with the traveling element encircling said mount, a plurality of rollers of convex flattened V-shaped configuration having a greater diameter at their middles and tapering to a lesser diameter at each end mounted in spaced relation around said traveling element and formed to ride on said annular track, said annular track being of a concave configuration complementary to said rollers, and a cutter carried on one of said segments and movable inwardly for severing the pipe as the traveling element is rotated.

References Cited in the file of this patent
UNITED STATES PATENTS

| | | |
|---|---|---|
| 760,128 | Jackson | May 17, 1904 |
| 888,724 | Moore | May 26, 1908 |
| 1,018,695 | Charpier et al. | Feb. 27, 1912 |
| 1,020,580 | Smith | Mar. 19, 1912 |
| 1,279,022 | Scott | Sept. 17, 1918 |
| 1,373,300 | Caffrey | Mar. 29, 1921 |
| 1,393,156 | Nonneman | Oct. 11, 1921 |
| 2,672,682 | Studebaker et al. | Mar. 23, 1954 |
| 2,716,280 | Ruhe | Aug. 30, 1955 |
| 2,739,382 | Petersen | Mar. 27, 1956 |
| 2,747,274 | Willard et al. | May 29, 1956 |
| 2,769,234 | Young | Nov. 6, 1956 |
| 2,796,792 | Dias | June 25, 1957 |

FOREIGN PATENTS

| | | |
|---|---|---|
| 652,388 | Great Britain | Apr. 25, 1951 |